Figure 1:
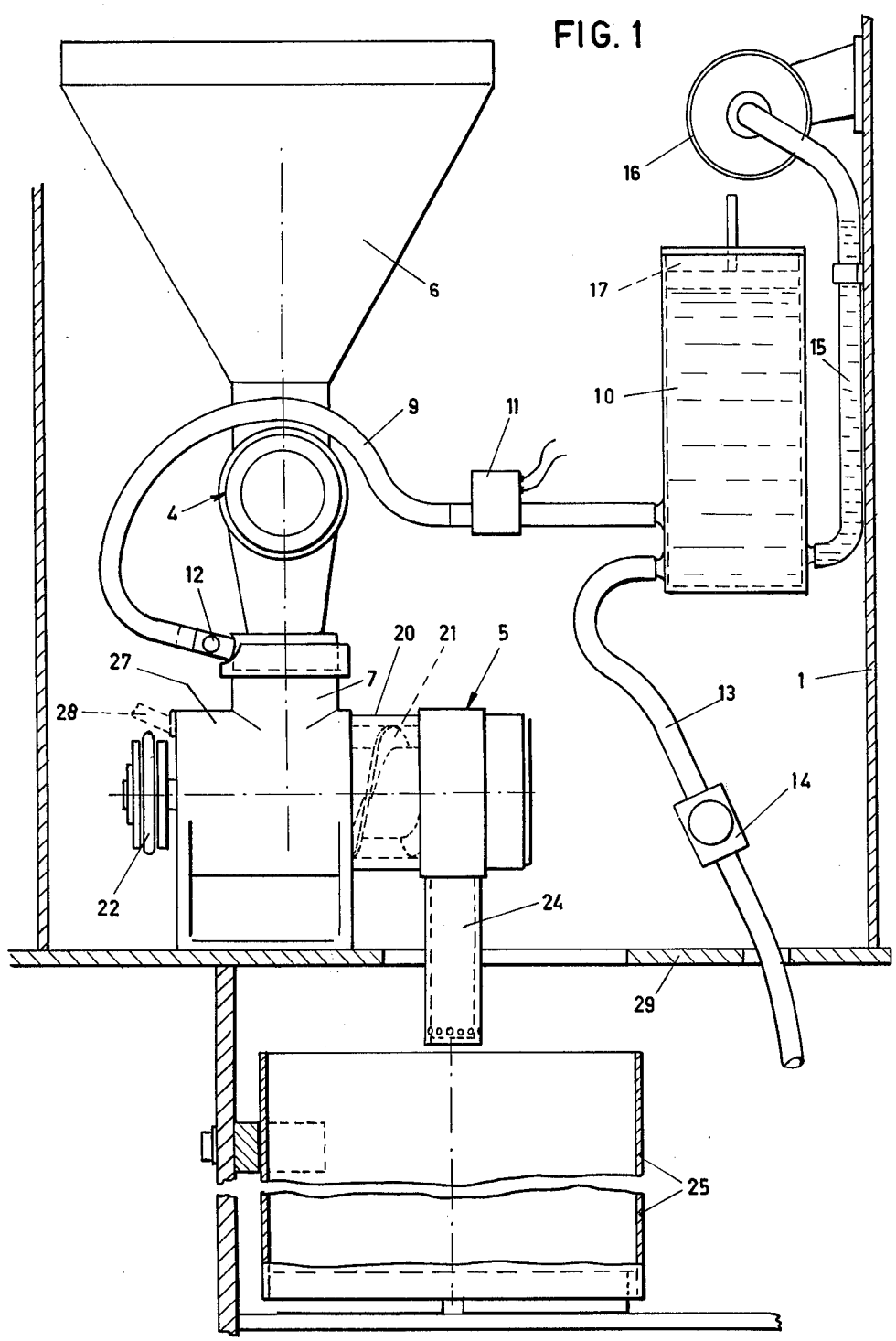

United States Patent [19]
Willemsen

[11] 3,929,319
[45] Dec. 30, 1975

[54] APPARATUS FOR PREPARING A DOUGH FROM A POWDERED MATERIAL AND A LIQUID

[76] Inventor: Willem Hendrik Willemsen, Westervalge 83, Warffum, Netherlands

[22] Filed: Oct. 5, 1973

[21] Appl. No.: 404,008

[30] Foreign Application Priority Data
Oct. 5, 1972 Netherlands.......................... 7213494

[52] U.S. Cl. .................................... 259/6; 259/192
[51] Int. Cl.² ............................................ B01F 7/08
[58] Field of Search ........... 259/191, 192, 193, 185, 259/5, 6, 194, 9, 10, 19, 20, 21, 23, 24, 41, 259/64, 68, 69; 99/348

[56] References Cited
UNITED STATES PATENTS
2,915,023 12/1959 Rapaport ................................ 259/6
3,203,370 8/1965 Haug .................................... 259/192
3,591,145 7/1971 Ainsworth ............................. 259/6
3,828,661 8/1974 Vink ...................................... 259/6

Primary Examiner—Robert W. Jenkins
Attorney, Agent, or Firm—Karl W. Flocks

[57] ABSTRACT

A method and an arrangement for preparing a dough-like material from a powdered material, mainly consisting of a starch containing powder, thickening agents and binders, to which a liquid, preferably water, is added, said powdered material and said liquid being continuously fed to a mixture device in such a way that no powdered material can come into contact with any part of the arrangement before it has reached said mixing device, the powdered material and the liquid being mixed in said device and being dispensed in liquid state from said mixing device to a dough receiving container in which said mixture stiffens to a dough.

4 Claims, 4 Drawing Figures

APPARATUS FOR PREPARING A DOUGH FROM A POWDERED MATERIAL AND A LIQUID

This invention relates to a method for preparing a dough-like material from a powdered material, mainly consisting of a starch-containing powder, thickening agents and binders, to which a liquid, preferably water, is added, said dough-like material being destined for the manufacture of so-called potato fries (French fries), croquettes and similar fried products and also relates to an arrangement for performing said method.

The invention aims at providing a method and an arrangement with the aid of which a dough-like material is obtained in which the liquid is well mixed with the powdered material so that it always has substantially the same properties.

This is accomplished with the method according to the invention in that one uses an arrangement comprising a mixing device to which the powdered material and the liquid are continuously fed in small quantities and in the desired proportion in such a way that no powdered material moistened with the liquid can come into contact with any part of the wall of the arrangement before it has reached the mixing device, the powdered material and the liquid mixed in said mixing device and being dispensed through a discharge from the mixing device to a dough receiving container in which said mixture stiffens to a dough. As a powdered material for the manufacture of potato fries, croquettes and suchlike products to be fried in oil or fat various mixtures of substances are used which mainly consist of a starch-containing powder, thickening agents and binders.

Mixing such a powdered material with a liquid, which usually consists of water, presents special difficulties, in particular with respect to the cleaning of the arrangement, because when the powdered material comes into contact with the water and with the wall of the arrangement it becomes so hard and adheres so firmly to the wall that it can only be removed with great difficulty. Since according to the invention no powder moistened with liquid comes into contact with any part of the arrangement before it has reached the mixing device, and the powdered material and the liquid only stay in the mixing device until it is mixed to a liquid mixture, whereupon said liquid mixture is discharged through the discharge from said mixing device, the powder mixed with water does not have the chance to harden and firmly adhere to the wall of the mixing device.

For this purpose a preferred embodiment of the arrangement for performing the method according to the invention is characterized in that it comprises a feeding device for feeding the powdered material and a feeding device for the liquid and a mixing device for the powdered material and the liquid supplied thereto, said arrangement being such that no powdered material moistened with the liquid can come into contact with the wall of the arrangement before it has reached the mixing device, said mixing device dispensing the mixture formed in liquid condition to a dough receiving container in which the mixture stiffens to a dough.

The arrangement according to the invention may comprise a mixing device with a common vertical channel for feeding the liquid and the powdered material to the supply side of the mixing device, said channel being provided with a feeding device for feeding the liquid such that it constitutes a liquid curtain in the form of a cylinder sleeve, and a feeding device for the powdered material embodied such that the powdered material supplied to the common channel is surrounded by the curtain of liquid, said mixing device comprising an outlet dispensing the mixture formed to a container in which the mixture stiffens to a dough. The fact that the curtain of liquid presents the shape of a sleeve within which the powdered material is supplied, reliably prevents said powder from coming into contact with the supply channel.

The mixing device and the feeding device for the powdered material may consist in a simple manner of a worm adapted to be driven. By driving said worms at a substantially constant speed one achieves that always per unit of time one and the same quantity of powdered material and liquid is continuously dispensed to the mixing device.

It is preferred to provide the worm of the feeding device for the powdered material and the worm of the mixing device each in a cylindrical housing, said housings being removably mounted in the arrangement. This presents the advantage that said worms and housings may easily be cleaned and said worms may be replaced, if required, by other worms. If desired the housings and the worms may be manufactured from transparent synthetic material which makes an easy check possible in order to see whether the worms and housings are well cleaned. Another advantage is that in the frame no cylindrical or similar spaces need be provided which means a saving of substantial cost involved. The housing for the worms may consist of a length of a normal tube available on the market and may be mounted in any manner known per se rapidly and firmly in the arrangement, for example by means of retaining clips.

The feeding device for the liquid of the arrangement according to the invention is embodied such that always a substantially constant quantity of liquid, adapted to the amount of supplied material, is fed to the mixing device.

A preferred embodiment of the arrangement according to the invention is characterized in that the feeding device for the liquid comprises a water reservoir provided with a piston or float movable between two predetermined positions, said water reservoir being provided with a supply line adapted to be connected to a water main and including a magnetic valve, with a line operating a level switch and with a line connecting said reservoir with the feeding device for water to the common supply channel, the latter line including a valve, said piston or float and the line to the level switch being embodied and arranged such that during operation at the lowest position of said piston or float the magnetic valve in the line connected to the water main is opened and at the highest position of the piston or float is closed. The water reservoir ensures that any pressure variations occurring in the water main cannot affect the quantity of water supplied.

According to the invention it is possible that in the line connecting the water reservoir to the common supply channel for the water and the powdered material a fine adjusting means is provided for accurately adjusting the amount of water supplied.

It is obvious that the invention is not restricted to the application of the afore-described water curtain, but that also in other ways one may ensure that no powdered material moistened by the liquid can come into contact with the wall of the arrangement before it has reached the mixing device. This may be accomplished according to the invention for example in that the arrangement comprises a mixing device with a feeding device for feeding the powdered material and a feeding device for the liquid which open at separate points at the supply side of the mixing device directly into said mixing device, the latter having an outlet dispensing the mixture formed to a dough receiving reservoir in which the mixture stiffens to a dough.

The invention will be further explained below with reference to the drawings showing by way of example an embodiment of the arrangement according to the invention.

The drawings show in

FIG. 1 a side view of said arrangement

Figure 2:
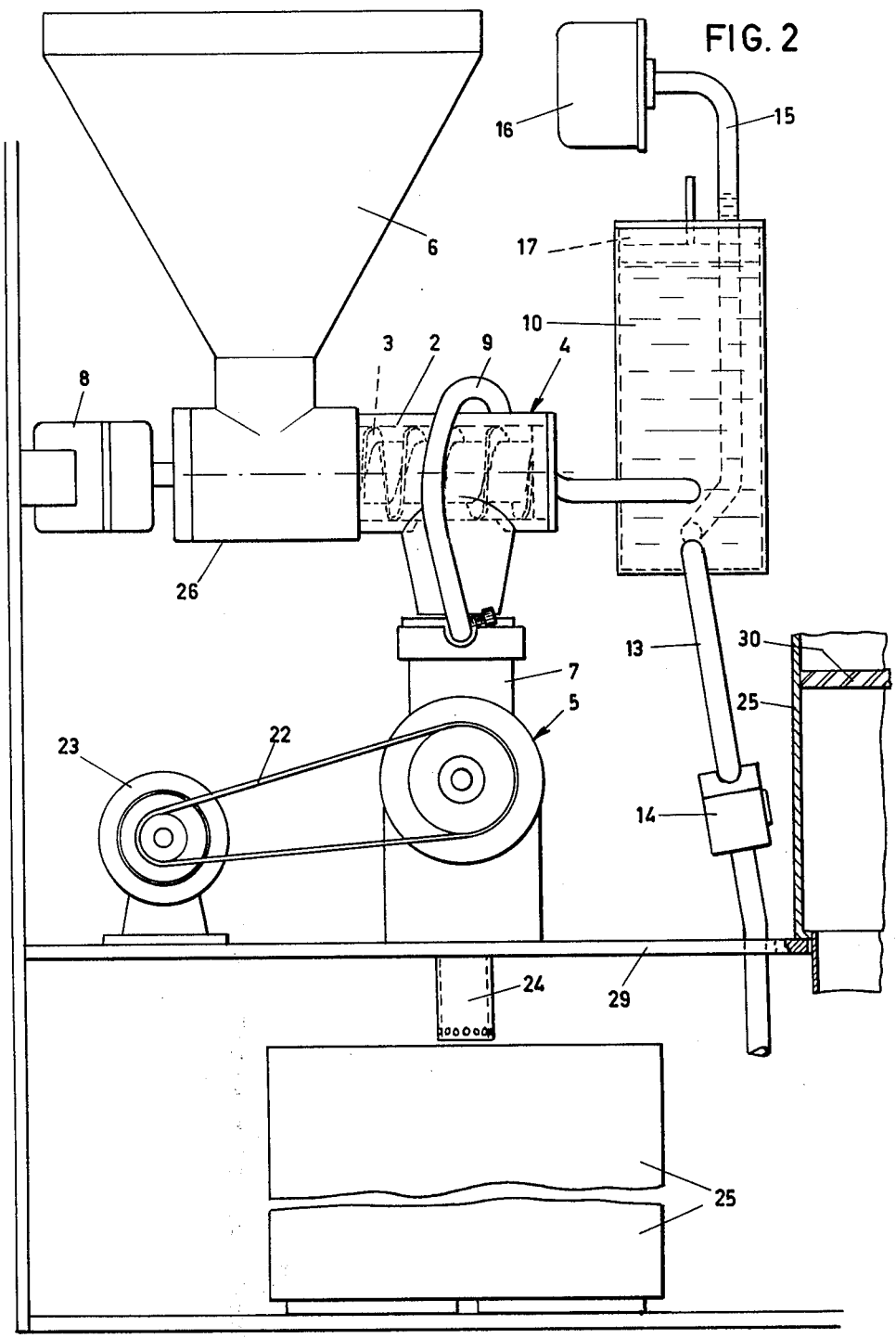

FIG. 2 a front view of said arrangement

Figure 3:
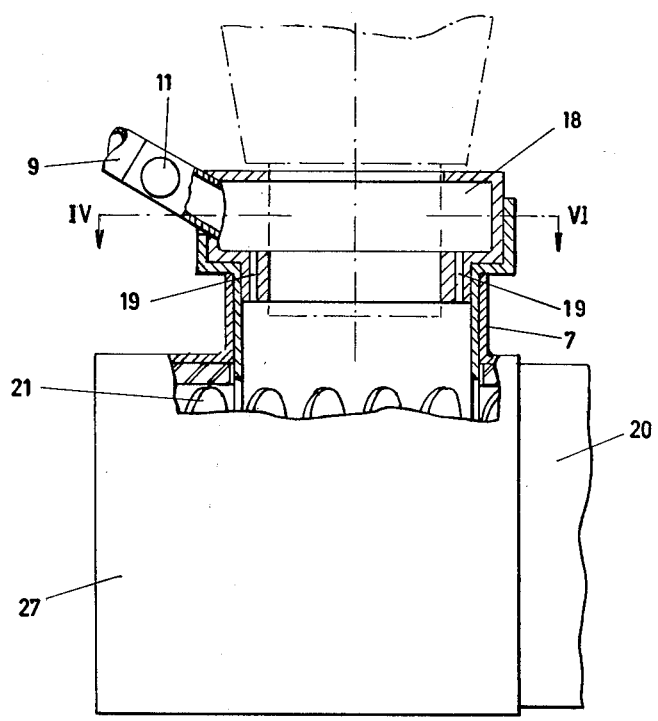
Figure 4:
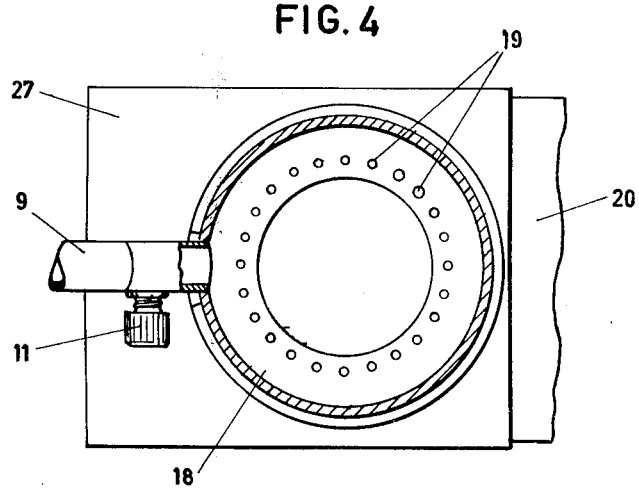

FIG. 3 a detail of said arrangement partly in longitudinal section and partly in view; and in FIG. 4 a section according to the line IV—IV in FIG. 3.

The arrangement shown in the drawings commprises a frame 1 in which there is mounted a feeding device 4 consisting of a worm 3 provided in a housing 2 and destined to supply a powdered material to a mixing device 5. This powdered material is contained in a hopper-like reservoir 6. The powdered material mainly consists of a mixture of a powder containing starch, thickening agents and binders. Such mixtures are generally available on the market.

The feeding device 4 for feeding the powdered material to the mixing device 5 is connected to the latter by means of a vertical channel 7 and is driven by a motor 8 such that always the same amount of powdered material is continuously supplied to said vertical channel 7.

The amount of liquid, in this case water, required for forming the dough is supplied to said vertical channel 7 through a conduit 9 which on the one hand is connected to a water reservoir 10 and on the other hand to said vertical channel. In said conduit 9 there are provided a low pressure valve 11 and a screw 12 for fine adjustment of the amount of water supplied to the vertical channel 7.

The water reservoir 10 is connected at its bottom to a water main (not shown) by a conduit 13 in which a high pressure magnetic valve 14 is provided. The water reservoir 10 is furthermore connected by a conduit 15 to a level switch 16 which closes the high pressure magnetic valve 14 when the water in the water reservoir 10 has reached the highest level and opens said valve 14 when the water in the water reservoir has reached its lowest level. For this purpose a float or piston 17 is provided in the reservoir 10. The difference between the highest and lowest level in the water reservoir is selected such that it amounts to about 2 to 2.5 cm. The result is that the pressure of the water supplied by the water reservoir 10 via the conduit 9 to the mixing device 5 only slightly changes independently of the pressure differences or pressure thrusts occurring in the water line so that consequently an almost constant amount of water flows without interruption through line 9.

The water supplied through the line 9 flows into a chamber 18 which is connected with the vertical channel 7 by a plurality of small apertures 19 arranged according to a ring. As a result the water flowing from said apertures forms a shell-like water curtain. The powdered material supplied by the worm 3 is fed within the apertures 19 arranged according to a ring to said channel 7 so that it is surrounded from all sides by said water curtain. In there the powdered material moistened with water is reliably prevented from coming into contact with the wall of the feed channel 7 before the powdered material has reached the mixing device. The mixing device 5 comprises a housing 20 in which there is provided a worm 21 which via a transmission 22 is driven by a motor at a constant speed. In said mixing device the powdered material and the water are mixed, the mixing time being selected such that the mixture obtained is dispensed in a liquid condition, therefore before it has stiffened to a dough, at an always constant rate through the outlet 24 of the mixing device 5 to the dough receiving container 25 which usually has a cylindrical shape.

The housing 2 of the feeding device 4 and the housing 20 of the mixing device are preferably each removably arranged in a receiving chamber 26 and 27 respectively such that said feeding device and said mixing device with the worms contained therein are easily accessible for purposes of cleaning, repair etc. after removal from said receiving chambers. To this end the worms are connected to the driving motors by a detachable coupling.

It is obvious that the invention is not restricted to the arrangement described in the preceding text and shown by way of example but that it may be modified in many ways without departing from the scope of the invention. For example: the water supply line may be connected, instead of to the vertical channel 7, as indicated in dotted lines 28 directly to the mixing device. In that case the powdered material and the water are fed directly to the mixing device itself so that the water curtain is eliminated.

For continuously feeding the powdered material and the liquid also other known means may be used.

The device for automatically mixing the powdered material and the liquid entails the possibility of providing on the horizontal dividing wall 29 shown in the drawing a moulding device for moulding sticks etc. for potato fries, croquettes and such like fried products, in addition to the device for forming the dough. When the dough receiving container 25 is filled it can be placed below said moulding device after which the next dough receiving container or the first dough receiving container respectively situated below the moulding device can be filled again with dough. Said moulding device may be operated by hand or mechanically. Moulding devices for moulding sticks and similar objects from dough-like material are already known so that of said moulding device the piston 30 and the container 25 situated below the latter are only partly shown.

I claim:

1. An apparatus for preparing a dough-like material from a powdered material mainly consisting of a starch-containing powder, thickening agents and binders, to which a liquid, preferably water, is added, said dough-like material being destined for the manufacture of so-called potato fries, croquettes and similar fried products, said apparatus comprising a feeding device for feeding a stream of said powdered material into a mixing device and a feeding device for feeding a stream of liquid into said mixing device, said mixing device having an outlet portion dispensing the mixture of powdered material and liquid in liquid state to a container in which said mixture stiffens to a dough-like material, said feeding device for said powdered material and said mixing device each including a worm adapted to be driven at a substantially constant speed, said worm of said feeding device for the powdered material and said worm of said mixing device each arranged in a cylindrical housing, said housings being removably mounted in the apparatus.

2. An apparatus for preparing a dough-like material from a powdered material mainly consisting of a starch-containing powder, thickening agents and binders, to which a liquid, preferably water, is added, said dough-like material being destined for the manufacture of so-called potato fries, croquettes and similar fried products, said apparatus comprising a feeding device for feeding a stream of said powdered material into a mixing device and a feeding device for feeding a stream of liquid into said mixing device, said mixing device having an outlet portion dispensing the mixture of powdered material and liquid in liquid state to a container in which said mixture stiffens to a dough-like material, said feeding device for the liquid including a water reservoir having a movable means movable between two predetermined positions, said water reservoir having a supply line adapted to be connected to a water main and including a magnetic valve, and having a line operating a level switch, and a line connecting said reservoir of said feeding device for water to a common supply channel, said latter line including a valve, said movable means and said line to said level switch cooperating with each other such that during operation at the lowest position of said movable means said magnetic valve in said line connected to the water main is opened, and at the highest position of said movable means is closed.

3. An apparatus according to claim 2 further characterized by said common supply channel for the water and the powdered material having a fine adjusting means for accurately adjusting the amount of water supplied.

4. An apparatus for preparing a dough-like material from a powdered material mainly consisting of a starch-containing powder, thickening agents and binders, to which a liquid, preferably water, is added, said dough-like material being destined for the manufacture of so-called potato fries, croquettes and similar fried products, said apparatus comprising a feeding device for feeding a stream of said powdered material into said mixing device and a feeding device for feeding a stream of liquid into said mixing device, said streams of liquid and powdered material being fed into an inlet portion of said mixing device, said mixing device having an outlet portion dispensing the mixture of powdered material and liquid in liquid state to a container in which said mixture stiffens to a dough-like material, said mixing device being provided at its said inlet portion with a vertical feeding channel for feeding the streams of liquid and of powdered material commonly into said inlet portion of said mixing device, said vertical feeding channel being provided with means for feeding the stream of liquid in the shape of a sleeve therein and with means for feeding said stream of powdered material through the interior of said liquid sleeve into said mixing device.

* * * * *